June 20, 1939.  J. MINDEK, JR  2,162,739

FOLDING FISH SPREADER

Filed May 21, 1937

Inventor

John Mindek, Jr.

By *Clarence A. O'Brien*
*Hyman Berman*

Attorneys

Patented June 20, 1939

2,162,739

UNITED STATES PATENT OFFICE 2,162,739

FOLDING FISH SPREADER

John Mindek, Jr., Kent, Ohio

Application May 21, 1937, Serial No. 144,067

1 Claim. (Cl. 43—28)

This invention relates to a fish hook spreader, the general object of the invention being to provide a spreader which can be folded and the parts held together when not in use, so that it can be readily carried from one place to another and stored.

Another object of the invention is to so form the means for connecting the hooks to the ends of the spreader that the hooks can be easily and quickly attached to the spreader and removed therefrom, and without danger of breaking the end portions of the spreader.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which.

Figure 1:
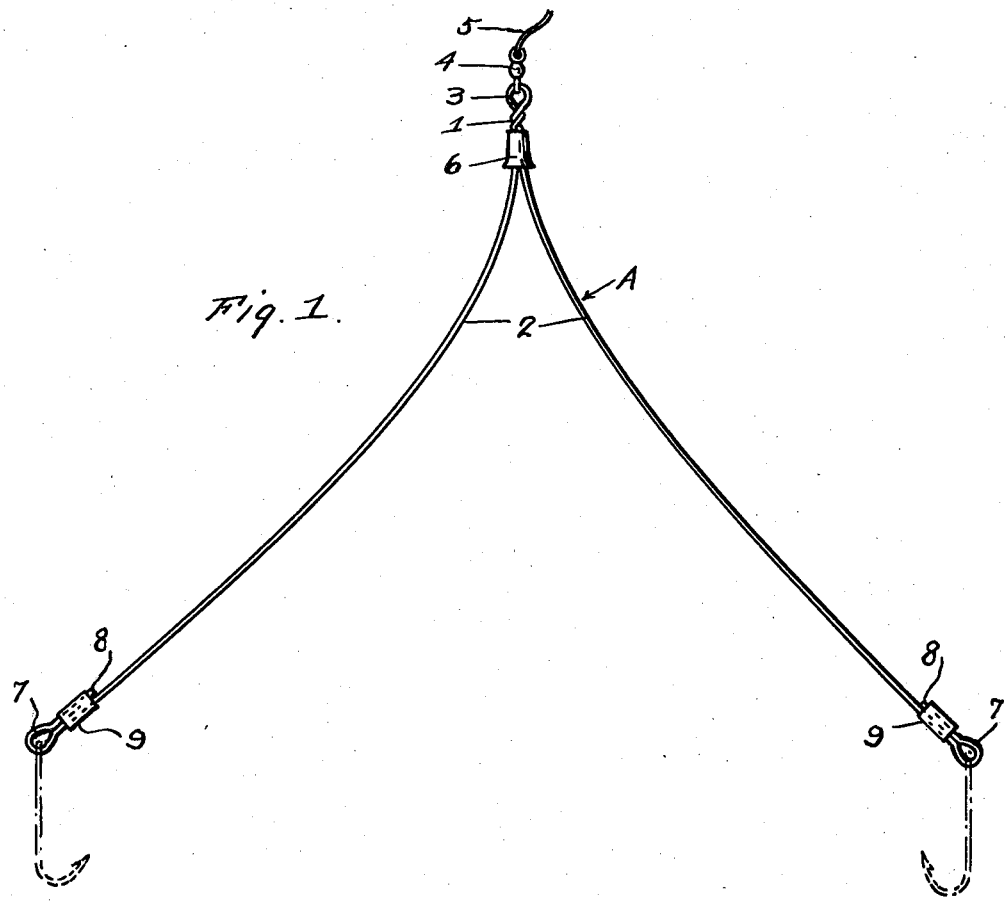
Figure 1 is a view of the spreader in open position.
Figure 3:
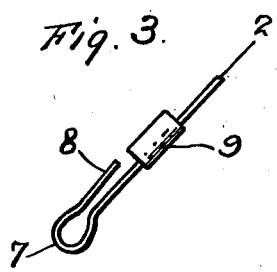
Figure 3 is a similar view, but showing the loop in open position.

As shown in these views, the spreader A is formed of a single piece of spring wire bent and twisted, as shown at 1, at its center to provide the legs 2. An eye 3 is formed by the twist and receives the swivel 4 to which the line 5 is attached. The parts 2 normally assume the position shown in Figure 1, but when the spreader is not in use or is being carried from one place to another, the two parts can be brought together by means of a bell sleeve 6 through which the parts 2 pass, for by sliding the sleeve toward the free ends of the device, it will cause the two parts to come together and the sleeve will hold the parts in this position. Then when the device is to be used, it is simply necessary to move the sleeve toward the loop 3 and then the members 2 will spring apart to the position shown in Figure 1.

Figure 2:
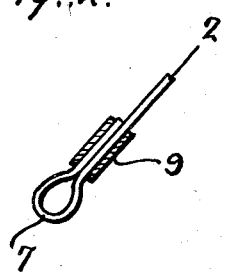
Figure 2 is a detailed sectional view of one end of the spreader, showing the loop for receiving a hook in closed position.

Each free end of the device is bent back and shaped to provide the eye or loop 7 and the short straight part 8, this part 8 being held against the major part of the limb of the device by a sleeve 9, shown in Figure 2. By moving the sleeve 9 upwardly, the straight part 8 will spring away from the major part, so that the eye of a fish hook can be threaded on the part 8 into the eye 7, after which the sleeve is moved to the position shown in Figure 2, to hold the hook in place. Thus a fish hook can be easily and quickly put in place or removed and as there is no twisting of the parts, the wire will not break at the loops or eyes 7, so that the device will have long life.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:

A fish hook spreader of the class described comprising a single piece of spring wire bent into loop form at its center and the two parts formed by the loop being twisted together for a slight distance adjacent the center portion, whereby said center portion forms an eye, the two portions of the wire curving in opposite directions from the twisted portion and having their extremities bent to form eyes for receiving fish hooks, and a sleeve of bell shape slidably arranged on the two parts below the twisted portion for bringing the two portions together when the sleeve is moved toward the hook receiving eyes, said two curved portions being slightly bowed toward each other to facilitate sliding movement of the sleeve on said portions when the sleeve is moved toward the hook receiving eyes.

JOHN MINDEK, JR.